(12) United States Patent
Varasteh

(10) Patent No.: US 8,242,922 B2
(45) Date of Patent: Aug. 14, 2012

(54) ELECTRONIC REMINDER DEVICE

(76) Inventor: Bitak Ahi Varasteh, Mission Viejo, CA (US)

( * ) Notice: Subject to any disclaimer, the term of this patent is extended or adjusted under 35 U.S.C. 154(b) by 532 days.

(21) Appl. No.: 12/386,937

(22) Filed: Apr. 23, 2009

(65) Prior Publication Data

US 2010/0271224 A1  Oct. 28, 2010

(51) Int. Cl.
*G08B 21/00* (2006.01)
(52) U.S. Cl. ............... 340/644; 340/309.16; 340/309.2; 340/309.3; 340/309.4; 340/309.9
(58) Field of Classification Search .......... 340/644, 340/309.16–309.9
See application file for complete search history.

(56) References Cited

U.S. PATENT DOCUMENTS

| | | | | |
|---|---|---|---|---|
| 5,510,584 A | * | 4/1996 | Norris | 200/5 A |
| 2006/0109750 A1 | * | 5/2006 | McCracken et al. | 368/244 |
| 2009/0167491 A1 | * | 7/2009 | Ozolins | 340/5.52 |

* cited by examiner

*Primary Examiner* — George Bugg
*Assistant Examiner* — Ojiako Nwugo

(57) ABSTRACT

A reminder device includes a controller, a switch, and an annunciator. When a user closes the switch, the controller turns on the annunciator for a fixed period of time. The annunciator may be a light source such as a flashing LED or an audio indicator. The signal from the annunciator communicates to a user that a particular task, such as taking a pill or locking a car door, has been completed and need not be further verified.

18 Claims, 2 Drawing Sheets

ELECTRONIC REMINDER DEVICE

BACKGROUND OF THE INVENTION

1. Field of the Invention

This invention concerns the field of memory reminder devices.

2. Background

In the course of daily life, people perform a great many tasks, many of which provide short-term indication of task completion. For example, that one is wearing clothing is a good indication that one has gotten dressed. Similarly, a person may determine whether he has eaten by the absence of hunger or whether she has bandaged a cut by the presence of a fresh dressing. Other tasks do not provide an immediate indication of completion. For example, unfed pet fish are nearly indistinguishable from fish that are fed. Taking some types of medication may produce detectable changes only at a much later time. Similarly, still other tasks, such as locking a car door, may provide an indication that the task is complete only to an observer adjacent the automobile. People generally rely on memory to ensure that many tasks are completed.

Unfortunately, memory is less than perfect as an indicator. People forget what they have done or misremember what they have not done. In many cases this does not matter much, but in some cases the results can be serious. Driving off to work with the house door left open leaves household contents exposed to thieves. Forgetting to lock the car door may make the car an easier target for vandalism or theft. Failing to take a medication, or taking an extra dose because one does not recall having taken a first dose, can have adverse medical consequences include severe injury or death.

People use a variety of devices to aid in remembering what they have done. Written checklists provide a record of the completion of each task on the list. A dated note applied to a fish tank declares that the fish are fed for that day. One can return home, perhaps after traveling for an extended period, to determine that the house door was indeed closed. One can return to the car to verify that the car door has indeed been locked. Counting the remaining pills in a bottle might help to determine whether the day's dose had been taken.

Certain electronic devices may also be helpful to confirm that tasks are complete. For example, a phone or PDA may function as an electronic version of the written checklist. Specialized devices are also available that perform related functions.

U.S. Pat. No. 7,081,807 for Automated Pill Reminder Bottles discloses an electronic cap for a medication bottle that includes a switch to sense opening of the bottle, a timer to count down a pre-determined interval after the opening, and an alert device to indicate when the next dose is due. Presumably, if the alert device is activated, a user can determine that a medication dose has not yet been taken. This may be problematic with medications that are taken fairly infrequently, such as once daily. A person taking a pill each morning might awaken a few minutes earlier than usual, note the absence of an alert, and mistakenly believe she had taken that day's dose.

U.S. Pat. No. 5,751,661 for a Medication Dosage Timing Apparatus is otherwise similar to U.S. Pat. No. 7,081,807 but includes a display. The display shows the time remaining to the next dose, counting down since the last opening. Close examination of the display could reveal that a pill has not yet been taken, but this may not be readily apparent as the display shows numbers that require interpretation.

U.S. Pat. No. 6,392,560 for a Reminding Device discloses a stopwatch connected by wires to a remote switch. The remote switch may be mounted in an annulus above the activating switch of a wireless garage door opener. Applying force to the remote switch closes the remote switch and transmits force to the garage door opener activating switch. This activates the wireless garage door opener and closes the garage door. The user can examine the stopwatch display to determine when the garage door was last closed. U.S. Pat. No. 6,392,560 mentions that the stopwatch may be replaced by LEDs to indicate the status of the garage door. No mention is made of how such a device would distinguish recent garage door closings from those remote in time.

SUMMARY OF THE INVENTION

This invention includes devices that function as electronic reminders associated by users with particular tasks. In some embodiments, the reminder device includes a switch, a controller, and an annunciator. The switch serves to activate the device. The annunciator, which may be a lamp such as a flashing light emitting diode (LED) or an audio indicator such as a beeper, serves to indicate to the users that the task has been completed. The controller serves to detect the activation of the switch and to turn on the annunciator for a fixed period of time. In use, a user presses the switch concurrently with performance of the task. The annunciator then serves as an evident reminder that the task has been completed. The annunciator shuts off automatically after the fixed period has elapsed to allow the device to be reused.

In some embodiments, the reminder device of the invention is configured for attachment to an external switch (for example, but not by way of limitation, the activating switch on a remote control such as a remote car door lock). The entire reminder device may be constructed in a variety of sizes appropriate to the task. In some embodiments, the entire reminder device may be of such small size that it may be conveniently mounted atop the external switch so that pressing the switch on the reminder device simultaneously transfers the pressing force to the external switch, accomplishing the desired task.

In some embodiments, the reminder device of the invention is configured for attachment to an external item associated with the task (for example, but not by way of limitation, a medication bottle, a refrigerator door, a fish tank, the gripping portion of a key, a key fob, a wallet, a purse, a telephone, a personal digital assistant (PDA), or a key fob). Attachment may be via a pressure sensitive adhesive applied to the back surface of the reminder device. Users may conveniently carry one or more reminder devices either on their persons or in their cars.

In some embodiments, the reminder device of the invention may also be used as a limited communication device between users rather than solely as an aid to memory. Once a first user completes the task and activates the reminder device, a second user may determine that the task is complete and need not be repeated. This is of particular use when the task is not a task personal to one of the users, for example, but not by way of limitation, feeding a family pet, making sure a house door is locked before the family goes to bed, etc.

In some embodiments, the reminder device of the invention may also be used to help prevent problems associated with drug interactions by clearly indicating to the user which drugs have already been taken. The reminder device may be coded by color or other indicia to indicate which drugs, medications, or vitamins may be safely taken together or not be taken together.

In some embodiments, the reminder device includes a controller having an input and an output; a switch capable of being in either of two states and electrically connected to the input; an annunciator electrically connected to the output; and a battery electrically connected to the controller; wherein the controller responds to a change in state of the switch by activating the annunciator for a fixed period of time.

In some embodiments, the reminder device of the invention includes a substantially planar substrate having a top surface and a bottom surface; a controller disposed on the substrate; an annunciator electrically connected to the controller and disposed on the top surface; and a pressure sensitive switch element electrically connected to the controller and disposed on the bottom surface; wherein application of a force to the top surface causes a change of state of the switch element and wherein the controller responds to a change in state of the switch element by activating the annunciator for a fixed period of time.

In some embodiments, the reminder device of the invention includes a housing with a top surface and a bottom surface; a controller disposed within the housing and having an input and an output; a pressure sensitive switch element with two electrical states disposed within the housing and electrically connected to the input; an LED capable of emitting light disposed within the housing and electrically connected to the output; and a battery disposed within the housing and electrically connected to the controller; wherein application of pressure to the housing changes the electrical states of the switch element and of the external switch and the controller responds to the change in state of the switch element by flashing the LED for a fixed period of time.

In some embodiments, the reminder device of the invention further includes a mounting link having a base with first and second ends and a connection loop attached to one end of the base such that the reminder device may be conveniently carried by attachment to another object such as a key fob or a set of keys.

DETAILED DESCRIPTION

Figure 1:
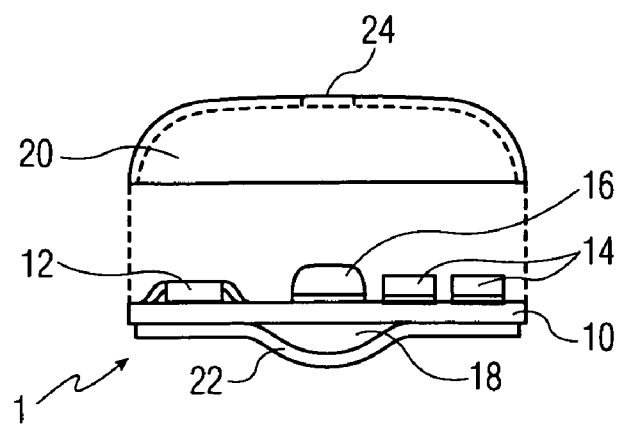
FIG. 1 is a partially exploded side view of one embodiment of the invention.

Turning now to the drawings, FIG. 1 shows a partially exploded side view of an embodiment of the reminder device of the invention. Reminder device 1 includes printed circuit board 10 and housing 20.

Printed circuit board 10 both mounts and electrically connects components one to another. Among the components mounted to printed circuit board 10 are controller 12, annunciator 16, switch 18, and battery 14. Typically, printed circuit board 10 has conductors on two sides with most components mounted to one side, in this case, to the top side. In some embodiments, switch 18 may mount to the bottom side of printed circuit board 10 so that the entire upper portion of reminder device 1 may be pressed to activate switch 18. In some embodiments, pressure sensitive adhesive 22 also mounts to the bottom side of printed circuit board 10. This is preferably in the form of double sided tape to facilitate mounting of reminder device 1 to a surface for use.

Controller 12 controls reminder device 1 and is mounted to printed circuit board 10 in a conventional manner, e.g. by soldering its electrical contacts to the traces of printed circuit board 10. Controller 12 is electrically connected to annunciator 16, to switch 18, and to battery 14 as described in more detail below. Controller 12 is preferably a single chip microcontroller for economy and for ease of assembly. A key attribute of controller 12 is its power consumption; low power consumption allows reminder device 1 to operate for extended periods without replacement or recharge of battery 14. Suitable single chip microcontrollers include the PIC family of microcontrollers manufactured by Microchip Technology Inc. of Chandler, Ariz. Preferably, controller 12 is a PIC 10F200 microcontroller.

Annunciator 16 provides indication to the user that reminder device 1 has been activated and, indirectly, that the task has been completed. Among indicators suitable for use as annunciator 16 are audio indicators such as beepers or speakers and visual indicators such as lamps, LEDs, liquid crystals, and electronic ink. Visual indicators are preferred to avoid irritation and confusion as to source of sound when multiple audio units are employed. Among visual indicators, those that emit light are preferable to absorptive elements such as liquid crystals and electronic ink because emissive indicators are generally visible at a greater distance and in the dark. Preferably annunciator 16 is an LED. Since LEDs consume relatively large amounts of power, annunciator 16 is preferably pulsed at intervals to save power while providing adequate visible indication of task completion. The interval from one pulse to the next should be short enough that a user need not spend excessive time looking to determine that annunciator 16 is active. Preferably LEDs serving as annunciator 16 should be pulsed more often than once every ten seconds, more preferably once each second to once every five seconds, and most preferably around once every three seconds. The duty cycle of LEDs serving as annunciator 16 depends on the visibility of the LEDs. Typically, a duty cycle of 0.1% to 10%, and preferably of around 1% is adequate for good visibility.

Switch 18 is a pressure-sensitive switch that when pressed, gives a signal to controller 12. Switch 18 may be a complete packaged switch or it may incorporate conductive traces on printed circuit board 10 in conjunction with a switch element that bridges such conductive traces to accomplish the switching function. Among such switch elements are conductive elastomeric "buttons" and metallic snap domes. Preferably, switch 18 includes a metallic snap dome as a switch element, such as those available from Snap Dome Products, East Sussex, UK. Metallic snap domes provide mechanical feedback by "clicking" when pressed. They are inexpensive and may be simply mounted to the bottom of printed circuit board 10 with adhesive tape. Such adhesive tape also insulates any conductive traces on the underside of printed circuit board 10.

Battery 14 provides power for operation of reminder device 1. Battery 14 is selected to match the power requirements of controller 12 and the overall size requirements of reminder device 1. Battery 14 may include rechargeable cells or primary cells, but preferably includes primary cells to reduce cost and eliminate the size and expense of recharge circuitry or connections. Battery 14 may be a single cell where the cell has sufficient potential and capacity, but is preferably a pair of alkali button cells arranged in series to deliver adequate voltage. Alternatively, battery 14 may include a single lithium coin cell.

Housing 20 covers, holds together, protects, and decorates reminder device 1. Housing 20 is shown in FIG. 1 separated from the other components to better reveal relationships. In actual use, housing 20 would be connected to the cover the other components to form a generally lozenge-shaped assembly Housing 20 may be fabricated by any of a variety of processes including casting, molding, stereolithography, three-dimensional printing, and machining. Preferably, housing 20 is injection molded of a polymer such as PVC, ABS, polystyrene, acrylic, or polycarbonate for low cost and durability. Alternatively, housing 20 may comprise a dollop of polymer such as silicone rubber or epoxy dispensed directly onto the printed circuit board to cover the components.

Figure 2:
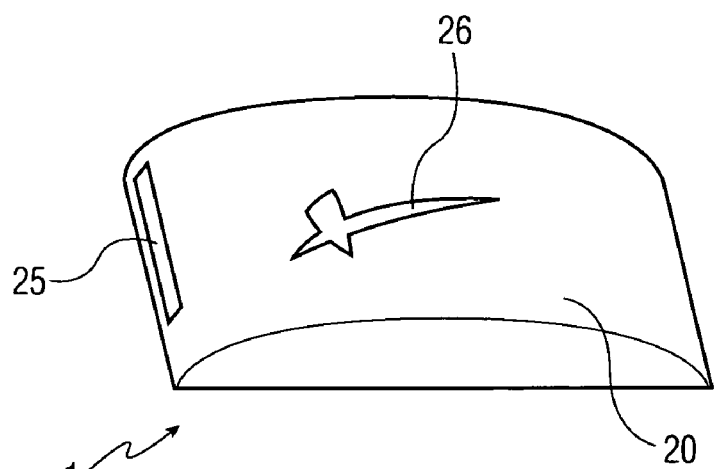
FIG. 2 is a perspective view of one embodiment of the invention.

Housing 20 needs provision for light to escape in embodiments where annunciator 16 emits light. Housing 20 may be pierced proximate the location of annunciator 16 to form aperture 24. Alternatively, as shown particularly in FIG. 2, housing 20 may be at least partially made of light transmitting material such as clear or colored translucent plastic. Preferably, housing 20 includes light emitting regions disposed on multiple surfaces of reminder device 1. Here, light emitting region 25 on the side of housing 20 allows viewing of light at low angles roughly parallel to the top surface of housing 20. An additional light emitting region 26 may be formed in the top surface of housing 20 to allow viewing of light at higher angles to the top surface of housing 20. Optionally, additional light emitting region 26 may be shaped as an icon such as a stylized checkmark or a company or product logo.

Housing 20 may be fabricated in a variety of ways including a clamshell with living hinge and locking features and a pair of mating parts with locking features to fold around and contain printed circuit board 10. Preferably, housing 20 is a molded shell covering and coupling to printed circuit board 10. In such embodiments, printed circuit board 10 forms the bottom of housing 10 and of reminder device 1. Switch element and pressure sensitive adhesive 22 may mount to the bottom side of printed circuit board 10 as described above.

Housing 20 may be fabricated of colored material such as tinted or pigmented polymers. One benefit of such tinted or pigmented materials is that multiple reminder devices 1 may be manufactured in different colors. These colors may serve as indicia of the task to which the particular reminder device is assigned. For example, a blue device may be associated with the task of feeding tropical fish and a green device may be associated with the task of watering houseplants. Alternatively, a group of commonly colored reminder devices 1 may be associated with drugs or other medications that may be taken together without fear of adverse interactions. Those drugs or medications that may adversely interact if taken together might be associated with reminder devices 1 of a different color.

In some embodiments, housing 20 may be a composite of at least two materials, one of which is tinted or pigmented and the second of which is substantially translucent to allow light emission. Such composite housings may be constructed, for example, by multiple shot injection molding or by assembly of parts separately manufactured.

Figure 3:
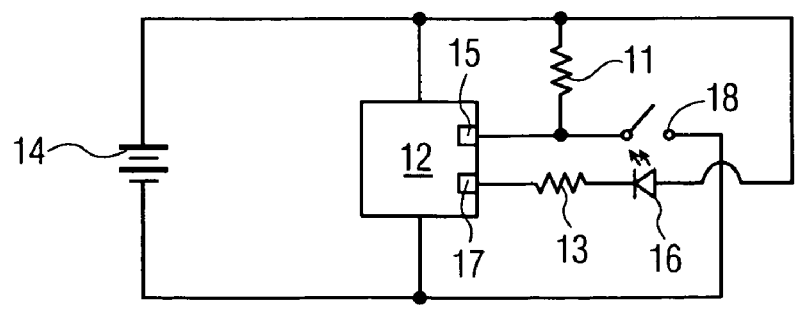
FIG. 3 is an electronic schematic of one embodiment of the invention.

FIG. 3 shows schematically the electronics of one embodiment of the reminder device of the invention. Controller 12 has input 15 and output 17. Battery 14 has positive terminals connected to respective power supply pins on controller 12. Input 15 couples to pull up resistor 11, which may be internal to controller 12, and to first contact of switch 18. Output 17 couples to limiting resistor 13, which may be internal to controller 12, and to cathode of LED 16. Anode of LED 16 connects to positive terminal of battery 14. Second contact of switch 18 connects to negative terminal of battery 14.

Controller 12 responds to closure of switch 18 by detecting change of state at input 15. In response, controller 12 asserts output 17 illuminating LED 16. Controller 12 maintains output 17 for a time corresponding to the desired "on" period of LED 16 and periodically reasserts output 17 to maintain the desired duty cycle and flash interval. This flash cycle continues for the entire desired signaling period. After expiration of the signaling period, controller 12 turns off output 17 and awaits the next closure of switch 15. In some embodiments, controller 12 may include routines to ignore electrical noise caused by bouncing of switch 15. Controller 12 may also include routines to prematurely terminate the signaling period upon repeated or sustained closure of switch 15.

In some embodiments, controller 12 may include additional outputs (not shown) coupled to additional distinguishable annunciators to indicate completion of multiple tasks. In such embodiments, the user may select the appropriate annunciator by repeated or sustained closure of switch 15 or by the closure of additional switches (not shown) coupled to additional inputs of controller 12.

The duration of the must be time long enough for reasonable check on task status. In some embodiments, the length of the signaling period may be adjustable or selectable. Preferably, a fixed signaling period of between ten minutes and ten hours reduces device complexity while providing adequate signaling time. More preferably, the signaling period should be around two hours. The purpose of limiting the signaling period is to provide a reasonable interval for a user to verify that a task is complete, to conserve battery life, and to allow reuse of the reminder device within a reasonable time.

Figure 4:
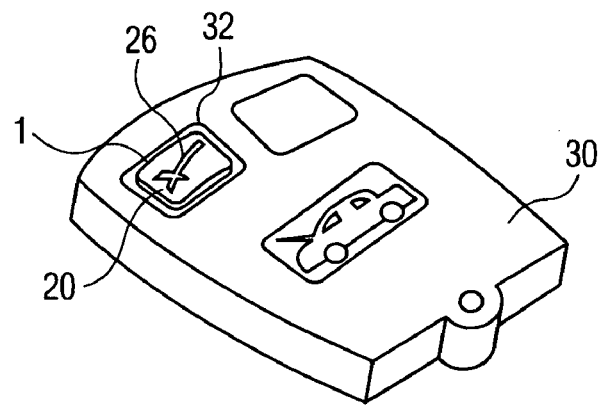
FIG. 4 is a perspective view of one embodiment of the invention attached to an external control, a remote controller for locking a car door.

FIG. 4 illustrates an application of one embodiment of reminder device 1 to a remote control (for example, but not by way of limitation, a car door locking remote control) 30. Reminder device 1 may mount via pressure sensitive adhesive 22 (see FIG. 1) to activating switch 32 of remote control 30. Pressure applied to the top surface of reminder device 1 both closes switch 18 and activating switch 32 of remote control 30. Light from annunciator 16 may be viewed through light emitting region 26 in housing 20 at a later time to verify the door had been closed.

In some embodiments, housing 20 may be larger than that illustrated in FIG. 4. Such larger embodiments may be sized to conveniently fit within a pocket or purse. Battery 14 may include one more larger batteries such as size "AA" or "AAA" batteries to extend useful battery life.

Figure 5:
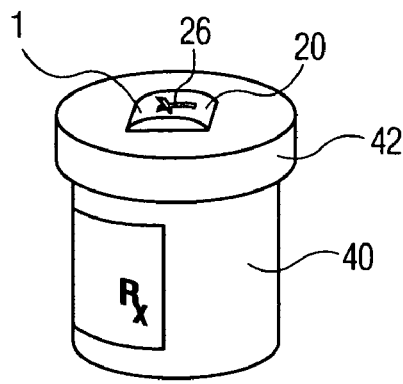
FIG. 5 is a perspective view of one embodiment of the invention attached to the lid of a medication bottle.

FIG. 5 illustrates application of one embodiment of reminder device 1 to a medication bottle. Bottle 40 has conventional removable cap 42. Reminder device 1 may mount via pressure sensitive adhesive 22 to cap 42. A user signifies taking a pill from bottle 40 by applying pressure to the top surface of reminder device 1, closing switch 18. Light from annunciator 16 may be viewed through light emitting region 26 in housing 20 at a later time to verify the pill was taken. Alternatively, reminder device 1 may be attached to bottle 40 to avoid conflict with the operation of "child-proof" caps. The attachment to bottle 40 may be via pressure sensitive adhesive 22 or preferably through an intermediate such as a flexible band or sleeve (not shown) surrounding bottle 40.

Figure 6:
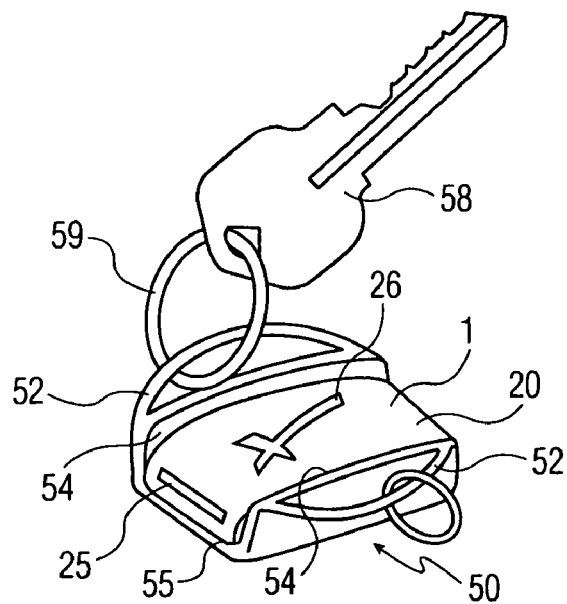
FIG. 6 is a perspective view of one embodiment of the invention including a mounting link.

FIG. 6 illustrates mounting link 50 that may be used in conjunction with some embodiments of reminder device 1. The purpose of mounting link 50 is to provide a convenient method of transporting one or more reminder devices 1. Mounting link 50 includes connection loops 52, parallel walls 54, and base 55. Parallel walls 54 and base 55 define a cavity sized to fit and retain at least one reminder device 1.

Mounting device 50 includes one or more connection loops 52. In some embodiments, two connection loops 52 attach to opposite ends of mounting device 50. The purpose of connection loops 52 is to couple mounting link 50 to commonly carried items such as keychain 59. The provision of multiple connection loops 52 is to allow mounting device 50 to serve as a link in a chain connecting keychain 59 to other items such as keys 58. Additional mounting links 50 may form further links in a chain such that multiple mounting devices 50 and multiple reminder devices 1 may be conveniently transported and identified by position in the chain. Alternatively, mounting link 50 may be connected to keychain 59 without further connections.

Connection loops 52 each couple to one of parallel walls 54. Parallel walls 54 are joined together by base 55 to form a cavity that fits and retains reminder device 1. Base 55 may be disposed between parallel walls 54 such that more than one cavity is created. For example, parallel walls 54 may extend on either side of base 55 to define a pair of cavities with one cavity on either side of base 55. Alternatively, the distance between parallel walls 54 may be increased to accommodate more than one of reminder device 1 within mounting link 50.

Parallel walls 54 are preferably of greater height than the thickness of reminder device 1 to reduce accidental activation of reminder device 1 retained within mounting link 50.

Reminder device 1 may be retained within mounting link 50 via pressure sensitive adhesive 22. Alternatively, mounting device 50 may include retainers, such as snap features (not shown) that serve to retain reminder device 1 within mounting link 50.

The Summary of the Invention and the Detailed Description refer to particular features of the invention. It is to be understood that the disclosure of the invention in this specification includes all appropriate combinations of such particular features. For example, where a particular feature is disclosed in the context of a particular aspect or embodiment of the invention, that feature can also be used, to the extent appropriate, in combination with or in the context of other particular aspects and embodiments of the invention, and in the invention generally.

The Summary of the Invention and the Detailed Description refer to exemplary applications and features of the invention. Such examples are provided only by way of illustration without intent to limit embodiments of the invention. Further, certain variations in the details set forth can be made without departing from the spirit of the invention; thus, resort should be had only to the appended claims in determining the scope of the invention.

I claim:

1. A reminder device to signal task completion to a user subject to lapses of memory, the device comprising: a controller having an input and an output; a switch capable of being in either of two states and electrically connected to the input; an annunciator electrically connected to the output; and a battery electrically connected to the controller; wherein the controller is configured to respond to a change in state of the switch by immediately activating the annunciator for a fixed period of time, wherein the fixed period of time is at least thirty minutes, and wherein the annunciator communicates to the user, the user being subject to lapses in memory, that the task has been completed.

2. The reminder device of claim 1 further comprising a housing disposed about the battery and a pressure sensitive adhesive mounted to the housing.

3. The reminder device of claim 1 wherein the annunciator is a lamp.

4. The reminder device of claim 3 wherein the lamp is a flashing LED.

5. The reminder device of claim 4 wherein the flashing LED has a duty cycle of between about 0.01% and about 10%.

6. The reminder device of claim 5 wherein the flashing LED flashes with a period of less than about ten seconds.

7. The reminder device of claim 1 wherein the fixed period of time is greater than about two hours and less than about ten hours.

8. The reminder device of claim 1 further comprising a mounting link including a base with first and second ends and a connection loop attached to one end of the base.

9. The reminder device of claim 8 wherein the mounting link further includes a second connection loop attached to the second end of the base.

10. The reminder device of claim 1 further comprising:
a substantially planar substrate having a top surface and a bottom surface;
the controller disposed on the substrate;
the annunciator disposed on the top surface; and
the switch including a pressure sensitive switch element.

11. The reminder device of claim 10 wherein the switch element includes a snap dome contact closure.

12. The reminder device of claim 10 wherein the switch element includes an elastomeric contact closure.

13. The reminder device of claim 10 wherein the switch element is disposed on the bottom surface, and wherein application of a force to the top surface causes a change of state of the switch element.

14. The reminder device of claim 10 further comprising a housing having an upper surface mounted above the top surface.

15. The reminder device of claim 14 wherein application of pressure to the housing changes the electrical state of the switch.

16. The reminder device of claim 14 wherein the annunciator emits light and wherein at least a portion of the emitted light exits the housing through the upper surface.

17. The reminder device of claim 1 wherein, when the annunciator is activated, the controller is configured to respond to a second change in state of the switch by deactivating the annunciator.

18. The reminder device of claim 17 wherein the second change of state is a prolonged closure or a repeated closure.

* * * * *